United States Patent [19]

Rosaen

[11] Patent Number: 4,836,021
[45] Date of Patent: Jun. 6, 1989

[54] FLUID FLOW METER

[75] Inventor: Lars O. Rosaen, Plymouth, Mich.

[73] Assignee: Universal Flow Monitors Inc., Hazel Park, Mich.

[21] Appl. No.: 27,849

[22] Filed: Mar. 19, 1987

[51] Int. Cl.$^4$ .............................................. G01F 3/04
[52] U.S. Cl. ...................................... 73/259; 73/254; 418/268
[58] Field of Search ................ 73/259, 254, 203, 199; 418/268, 82

[56] References Cited

U.S. PATENT DOCUMENTS

| | | | |
|---|---|---|---|
| 1,050,905 | 1/1913 | Baade | 73/259 |
| 1,618,436 | 2/1927 | Kapuczin | 73/259 |
| 2,010,876 | 8/1935 | Morgan | 73/254 |
| 3,269,182 | 8/1966 | Granberg | 73/254 |
| 3,329,067 | 7/1967 | Rosaen | 418/268 |
| 3,639,089 | 2/1972 | Lock | 418/268 |
| 3,683,694 | 8/1972 | Granberg | 73/259 |
| 4,468,964 | 9/1984 | Groeneweg | 73/259 |
| 4,484,863 | 11/1984 | Pagel | 418/268 |
| 4,498,497 | 2/1985 | Rosaen | 73/199 |
| 4,505,653 | 3/1985 | Roberts | 418/268 |
| 4,505,654 | 3/1985 | Dean, Jr. et al. | 418/268 |
| 4,611,977 | 9/1986 | Shibuya et al. | 418/268 |
| 4,640,125 | 2/1987 | Carpenter | 73/259 |

Primary Examiner—Joseph A. Orsino
Assistant Examiner—Brent A. Swarthout
Attorney, Agent, or Firm—Gifford, Groh, Sheridan, Sprinkle and Dolgorukov

[57] ABSTRACT

A flow meter having a housing with an inlet, an outlet and a cylindrical housing chamber fluidly connected in series between the inlet and the outlet. A cylindrical rotor is rotatably mounted within the housing chamber about an axis which is eccentric with respect to the axis of the housing chamber. In addition, a plurality of circumferentially spaced vanes are radially slidably mounted within the rotor. These vanes are urged radially outwardly into sealing contact with a housing wall which defines the housing chamber. A fluid working chamber is formed between each pair of vanes, the outer periphery of the rotor and the housing wall and this working chamber increases in size from the housing inlet and to the housing outlet. In operation, fluid flow into the housing inlet rotatably drives the rotor until the fluid is exhausted through the housing outlet. A detector detects the speed of rotation of the rotor thereby providing an indication of the fluid flow rate through the flow meter.

6 Claims, 2 Drawing Sheets

FLUID FLOW METER

BACKGROUND OF THE INVENTION

I. Field of the Invention

The present invention relates to fluid flow meters.

II. Description of the Prior Art

There are a number of previously known fluid flow meters which measure the rate of fluid flow through the flow meter. For example, in one type of previously known flow meters, a movable vane creates a variable size opening between the outer periphery of the vane and a housing wall. A spring urges the vane to a closed position while, conversely, fluid flow urges the vane to an open position. Thus, as the fluid flow increases, the vane rotates to a more open position than with a lower fluid flow rate and vice versa. The actual rotational position of the vane provides an indication of the fluid flow rate.

In still another type of fluid flow meter, an orifice is provided between the inlet and the outlet while a tapered needle is positioned within the orifice to variably restrict it. Either the orifice or the needle is movable in response to fluid flow thus varying the fluid restriction of the orifice in accordance with the fluid flow rate. A mechanical detector determines the position of the movable member, i.e. either the tapering needle or the orifice, and this position provides an indication of the fluid flow rate through the flow meter.

All these previously known flow meters, however, do not provide a highly accurate indication of a fluid flow rate and thus are unsuitable for numerous applications.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
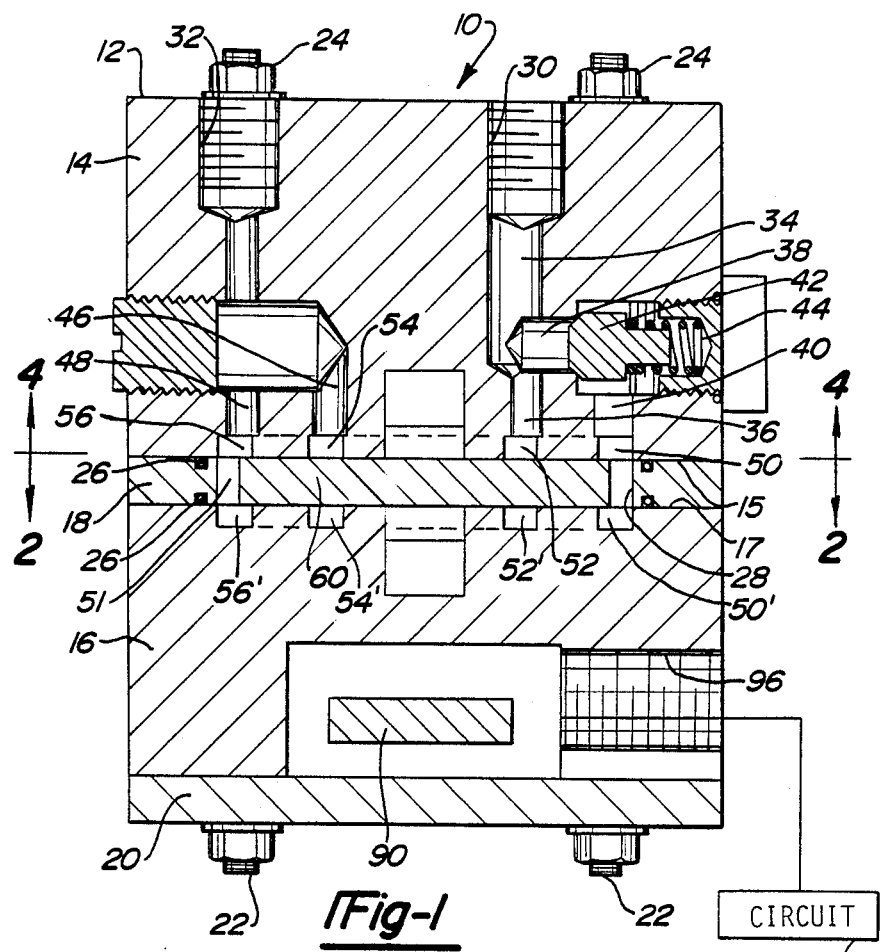
FIG. 1 is a longitudinal sectional view illustrating a preferred embodiment of the present invention and taken substantially along line 1—1 in FIG. 2.

With reference first to FIG. 1, a preferred embodiment of the flow meter 10 of the present invention is there shown and comprises a generally cylindrical housing 12 having a top section 14, a bottom section 16, an annular ring 18 disposed in between the top and bottom sections 14 and 16, respectively, and a cover 20. The housing sections 14 and 16, ring 18 and cover 20 are secured together by studs 22 and bolts 24. Appropriate seal members 26 are also disposed in between the ring 18 and the housing sections 14 and 16 in order to fluidly seal the ring 18 and housing sections 14 and 16 together.

Figure 2:
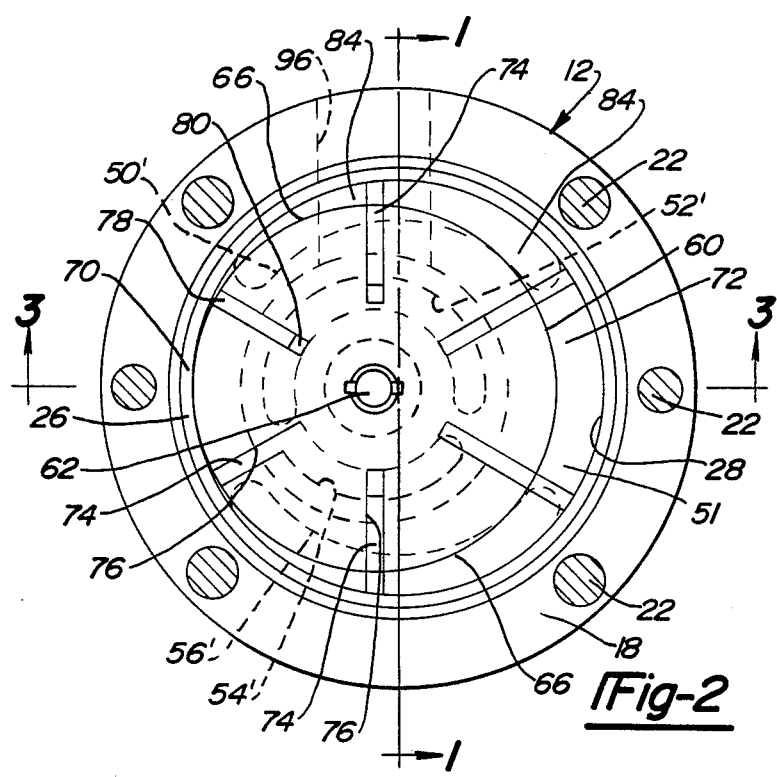
FIG. 2 is a crossectional view taken substantially along line 2—2 of FIG. 1.

With reference now to FIGS. 1 and 2, the inner periphery of the ring 18 forms a cylindrical wall 28 within the housing 12 which, in turn defines a cylindrical housing chamber 51. This cylindrical wall 28, furthermore, is aligned with the axis of the housing 12 as best shown in FIG. 2.

Referring again to FIG. 1, the housing 12 includes a fluid inlet 30 and a fluid outlet 32. Both the fluid inlet 30 and outlet 32 are adapted for connection to conventional fluid fittings of a fluid system (not shown). In use the inlet 30 and outlet 32 are connected in series with the fluid system through which the measurement of fluid flow is desired.

Referring now particularly to FIG. 1, the fluid inlet 30 is connected to an inlet passageway 34 which is directly open to an inner fluid passageway 36. In addition, the inlet passageway 34 is fluidly connected by a cross passageway 38 to an outer fluid passageway 40 which is generally parallel to, but spaced radially outwardly from, the inner passageway 36. A spring loaded check valve 42 is disposed within the cross passageway 38 and includes a spring 44 which resists fluid flow through the cross passageway 38 and to the outer passageway 40. Consequently, the check valve 42 maintains the fluid pressure in the inner passageway 36 at a higher pressure than the outer passageway 40 for a reason to be subsequently described.

Still referring to FIG. 1, the outlet 32 is also fluidly connected to an inner fluid passageway 46 and an outer fluid passageway 48 which is spaced radially outwardly from the fluid passageway 46. Furthermore, the passageways 46 and 48 are substantially diametrically opposed from the corresponding inlet passageways 36 and 40. Unlike the inlet passageway, however, there is no check valve in the outlet passageway so that the fluid pressures in the outlet passageways 46 and 48 are substantially equal to each other.

Figure 4:
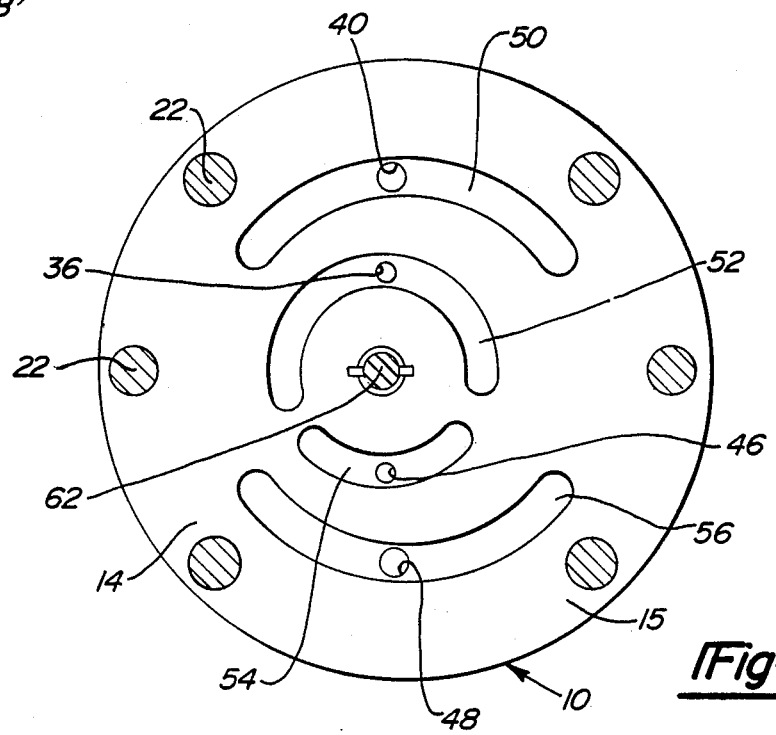
FIG. 4 is a crossectional view taken along line 4—4 in FIG. 1.

Referring now particularly to FIGS. 1 and 4, the inner inlet passageway 36 is open to an annular groove 52 formed in the bottom 15 of the housing section 14 and thus open to the housing chamber 51 formed by the ring 18. Similarly, the outer inlet passageway 40 is open to an annular groove 50 also formed in the bottom 15 of the housing section 14.

Similarly, the inner outlet passageway 46 is open to an annular groove 54 in the bottom 15 of the housing section 14 while the outer outlet passageway 48 is open to an annular groove 56 also formed in the bottom 15 of the housing section 14. The annular grooves 50, 52, 54 and 56 are all open to the housing chamber 51 formed by the ring 18 so that the housing chamber 51 is connected in series between the housing inlet 30 and the housing outlet 32.

With reference particularly to FIGS. 1 and 2, arcuate grooves 50', 52', 54' and 56' are also formed in the top 17 of the housing section 16 which are aligned with the corresponding arcuate grooves 50–56 for a reason to be subsequently described.

Figure 3:
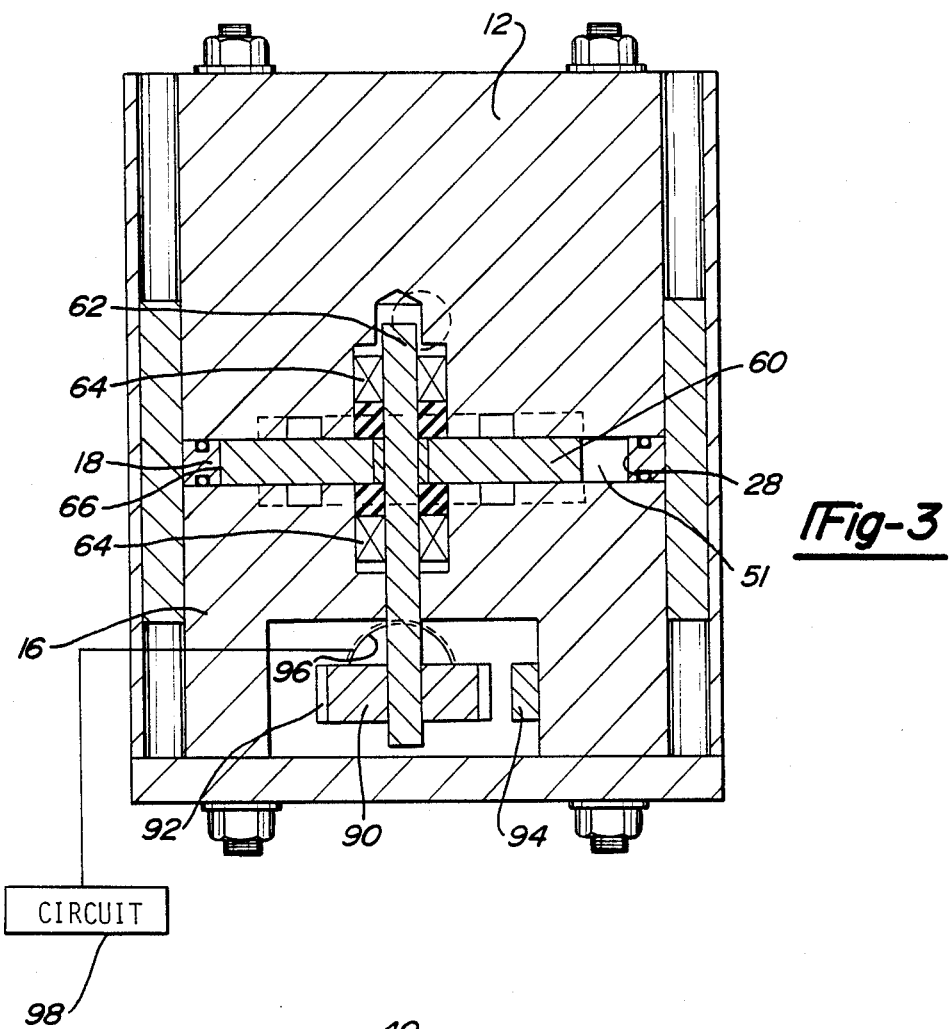
FIG. 3 is a sectional view taken substantially along line 3—3 in FIG. 2.

Referring now particularly in FIGS. 2 and 3, a cylindrical rotor 60 having an axial shaft 62 is rotatably mounted by bearings 64 to the housing 12 so that the rotor 60 is positioned within the housing chamber 51. However, as best shown in FIG. 2, the axis of the shaft 62 is offset or eccentric with respect to the axis of the housing 12 so that an outer periphery 66 of the rotor 60 is positioned closely adjacent the housing wall 28 along one side 70 (FIG. 2) of the ring 18 but is spaced from the housing wall 28 at its diametrically opposed side 72 (FIG. 2).

Referring now particularly to FIG. 2, a plurality of circumferentially spaced vanes 74 are each radially slidably received within a slot 76 formed in the rotor 60 so that the vanes 74 are circumferentially equidistantly spaced from each other. Each vane 74, furthermore, includes an outer end 78 and an inner end 80. The outer end 78, furthermore, is configured to sealingly engage the housing wall 28.

With reference now particularly to FIG. 2, the rotor 60 together with the vanes 74 divide the housing chamber 51 into a plurality of different working chambers 84 wherein each chamber 84 is bounded by the outer periphery 66 of the rotor 60, two adjacent vanes 74 and the housing wall 28. Since the rotational axis of the rotor 60 is offset from the axis of the housing chamber 28, the volume of each working chamber 84 increases in size from the work chamber 84 open to the inlet passageway 40 and begin to decrease as the work chamber 84 becomes open to the outlet passageway 48 via the groove 56.

Referring now to FIGS. 2 and 4, the arcuate length of the grooves 50 and 56 are designed such that the arcuate distance between the grooves 50 and 56 is always greater than the arcuate distance between two vanes 74. Thus, the grooves 50 and 56 are never directly in fluid communication with each other.

In operation, fluid flow enters the fluid inlet 30, moves through passage 34 and check valve 42 and into the inlet passageway 40. The check valve 42, however, creates a differential pressure between the passageways 36 and 40 so that the pressure in the passageway 36 is greater than the pressure in the passageway 40. The passageway 36 in turn is open to the annular groove 52 (FIG. 4) in the housing section 14 and thus open to the inner ends 80 of the vanes 74. Consequently, the fluid pressure from the inlet 30 forces the vanes 74 radially outwardly and into sealing contact with the housing wall 28 (FIG. 2).

Fluid flow into the housing inlet 30 thus rotatably drives the rotor 60 in a clockwise direction as viewed in FIG. 2. When the fluid in the working chambers 84 becomes open to the outlet groove 56, the rotor 60 effectively exhausts the fluid out through the outlet 32 since the size of the working chambers 84 effectively decreases as the working chambers 84 pass over the outlet groove 56.

Since the matching arcuate grooves 50, 50', 52, 52', 54, 54', 56 and 56' are positioned on both axial ends of the rotor 60 as best shown in FIG. 1, these arcuate grooves fluidly balance the rotor 60 during operation of the flow meter. As such, these matching grooves prevent excessive wear of the flow meter which would otherwise be caused by excessive pressure on one side only of the rotor 60.

Other means can also be used to urge the vanes radially outwardly.

From the foregoing, it can be seen that the rotation of the rotor 60 provides an indication of the fluid flow rate from the inlet 30 and to the outlet 32. With reference now to FIGS. 1 and 3, a gear 90 having teeth 92 is secured to the rotor shaft 62. A proximity detector 94 (FIG. 3) detects the rotation of each tooth 92 on the gear wheel 90 and provides an output signal through an electrical connector opening 96 to an electrical circuit 98. The electrical circuit 98 can be of any conventional construction so that further discussion thereof is unnecessary. However, the circuit 98 provides an indication of the fluid flow rate through the flow meter 10 by measurement of the speed of rotation of the shaft 62. Similarly, the number of rotations of the shaft 62 with its attached rotor 60 provides an indication of the volume of flow through the flow meter 10.

In the preferred form of the invention, the housing wall 28 of the housing ring 18 is constructed of a relatively hard material while the vanes 74 are constructed of a relatively soft material. Thus, during operation of the flow meter 10, the vanes gradually wear due to their sliding contact with the housing wall 28. Consequently, after long usage of the flow meter 10, replacement of the vanes 74 may be required. However, it is much simpler and less expensive to replace the vanes 74 than other components of the flow meter.

The flow meter of the present invention provides a highly accurate and highly reliable flow meter for use in fluid systems. Having described my invention, however, many modifications thereto will become apparent to those having ordinary skill in the art without deviation from either the spirit or scope of the invention as defined by the appended claims.

I claim:

1. A flow meter comprising
   a housing having an inlet, and outlet, and a substantially cylindrical chamber, said inlet and said outlet being open to said housing chamber at angularly spaced positions so that said housing chamber is fluidly connected in series between said inlet and said outlet, said chamber having an outer wall,
   a rotor rotatably mounted to said housing within said chamber, said rotor having an axis of rotation offset from the center of said housing chamber,
   a plurality of vanes, each vane being radially slidably mounted to said rotor, each vane having an inner end and an outer end, said outer end of each vane adapted to contact said outer chamber wall,
   means for urging said vanes radially outwardly from said rotor,
   means for detecting rotation of said rotor,
   wherein said urging means comprises means for creating a differential fluid pressure between the inner and outer ends of said vanes so that the fluid pressure at the inner ends of said vanes exceeds the fluid pressure at the outer ends of said vanes,
   wherein said inlet is open to a first passageway and a second passageway, said first passageway being open to the inner ends of said vanes along a portion of said housing chamber and said second passageway being open to an outer periphery of said rotor along a portion of said housing chamber, and wherein said differential pressure creating means comprises a check valve between said passageways.

2. The invention as defined in claim 1 wherein each passageway is arcuate and is positioned in said housing along one axial side of the rotor.

3. The invention as defined in claim 2 and comprising two balancing passageways in said housing, said balancing passageways being substantially the same shape and size as said first and second passageways, respectively, but being positioned on the axial end of the rotor opposite from said first and second passageways.

4. The invention as defined in claim 1 wherein said housing wall is constructed of a material harder than said vanes.

5. The invention as defined in claim 1 wherein said detecting means comprises means for measuring the speed of rotation of said rotor.

6. The invention as defined in claim 1 wherein said detecting means comprises a gear and a proximity detector associated with said gear.

* * * * *